US012574328B2

(12) United States Patent
Chen et al.

(10) Patent No.: US 12,574,328 B2
(45) Date of Patent: Mar. 10, 2026

(54) APPLICATION REQUEST PROCESSING METHOD, SYSTEM, ELECTRONIC DEVICE AND STORAGE MEDIUM

(71) Applicant: ZTE CORPORATION, Shenzhen (CN)

(72) Inventors: Gang Chen, Shenzhen (CN); Wei Zhang, Shenzhen (CN); Zhicheng Jiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 493 days.

(21) Appl. No.: 18/002,700

(22) PCT Filed: May 18, 2021

(86) PCT No.: PCT/CN2021/094397
§ 371 (c)(1),
(2) Date: Dec. 21, 2022

(87) PCT Pub. No.: WO2021/258923
PCT Pub. Date: Dec. 30, 2021

(65) Prior Publication Data
US 2023/0269188 A1 Aug. 24, 2023

(30) Foreign Application Priority Data
Jun. 24, 2020 (CN) .......................... 202010589409.7

(51) Int. Cl.
*H04L 47/20* (2022.01)

(52) U.S. Cl.
CPC .................................... *H04L 47/20* (2013.01)

(58) Field of Classification Search
CPC ..... H04L 47/20; H04L 12/14; H04L 12/1407; H04M 15/00; H04M 15/44; H04M 15/66; H04W 4/24; H04W 28/0268; H04W 28/10
(Continued)

(56) References Cited

U.S. PATENT DOCUMENTS

2010/0153695 A1* 6/2010 Bussard .............. G06F 21/6245
713/1
2019/0158408 A1* 5/2019 Li ......................... H04W 72/56
(Continued)

FOREIGN PATENT DOCUMENTS

| CN | 102024235 A | 4/2011 |
|---|---|---|
| CN | 110049070 A | 7/2019 |
| WO | 2018/169382 A1 | 9/2018 |

OTHER PUBLICATIONS

3rd Generation Partnership Project; "Technical Specification Group Core Network and Terminals; 5G System; Policy and Charging Control signalling flows and QoS parameter mapping," Stage 3 (Release 16), V16.3.0, dated Mar. 27, 2020; 4 pgs.
(Continued)

*Primary Examiner* — Obaidul Huq
(74) *Attorney, Agent, or Firm* — HAUPTMAN HAM, LLP

(57) ABSTRACT

The embodiment of the present application relates to the technical field of communication and discloses an application request processing method, including: forming an overall service rule in response that two or more different application requests exist for a user on a service, wherein the overall service rule comprises a service rule of each application request. The embodiment of the present application also discloses an application request processing system, electronic device and storage medium. The embodiment of the present application provides an application request pro-
(Continued)

Starting

↓ determining whether two or more different application requests exist for a user on a service — S101

↓ Yes — S102 forming an overall service rule, where the overall service rule contains a service rule of each application request

↓

Ending ← No cessing method, system, electronic device and storage medium that enable multiple application requests for the user on the service to be responded.

8 Claims, 7 Drawing Sheets

(58) Field of Classification Search
USPC .................................................. 370/229, 235
See application file for complete search history.

(56) References Cited

U.S. PATENT DOCUMENTS

| | | | |
|---|---|---|---|
| 2020/0092424 A1 | 3/2020 | Qiao et al. | |
| 2021/0105196 A1* | 4/2021 | Dao ...................... | H04L 43/026 |

OTHER PUBLICATIONS

China Mobile, "23.501:PCF provides PCC rule to SMF based on Local routing indication in subscription information", 3GPP Draft; S2-1912206, dated Nov. 8, 2019; 8 pgs.

Decision to Grant a Patent in Corresponding Japanese Application No. 2022-580274, dated Oct. 3, 2023; 5 pgs.

Extended Search Report in Corresponding European Application No. 21828711.8, dated Apr. 12, 2024; 15 pgs.

Oppo, "Correction on the QoS Flow binding with Alternative QoS Parameter Set(s)", 3GPP Draft; S2-2002801, vol. SA WG2, No. Online Meeting, dated Apr. 9, 2020; 5 pgs.

ZTE et al., "Corrections To AF Traffic Routing Procedures," 3GPP Draft; C3-186457, dated Oct. 8, 2018; 8 pgs.

First Office Action issued in Chinese Application No. 202010589409. 7; mailed Jun. 27, 2024; 14 pgs.

"corrections to AF traffic routing procedures"; ZTE, Huawei/C3; 3GPP TSG-CT WG3 Meeting #98Bis; Oct. 15-18, 2018; 11 pgs.

"Correction on the QoS Flow binding with Alternative QoS Parameter Set(s)"; OPPO/SA2; 3GPP TSG-SA2 Meeting #138-E; Apr. 20-23, 2020; 5 pgs.

"23.501: PCF provides PCC rule to SMF based on Local routing indication in subscription information"; China Mobile/ SA WG2; 3GPP TSG-SA2 Meeting #136; Nov. 18-22, 2019; 8 pgs.

International Search Report and Written Opinion issued in International Patent Application No. PCT/CN2021/094397; mailed Jun. 30, 2021; 11 pgs.

ZTE, Huawei; "Corrections to AF Traffic Routing Procedures", 3GPP TSG-CT WG3 Meeting #98Bis, C3-186457, Oct. 15-19, 2018; 7 pgs.

China Mobile, "23.501:PCF Provides PCC Rule to SMF Based on Local Routing Indication in Subscription Information", 3GPP TSG-SA2 Meeting #136, S2-1912206, Reno, US, Nov. 18-22, 2019; 7 pgs.

* cited by examiner

SMF        PCF        NEF        AF

1. SM policy association establishment

2. AF session QoS application 3. mapping service and QoS parameters 4. establishment of policy authorization session 1

5. sending PCC Rule 1(including the priority of the rule, service flow 1 and Qos rule 1) according to service information and Qos information decision authorization 6. sending policy Rule PCC Rule 1

7. executing PCC Rule 1, selecting UPF to introduce service routing

8. AF session QoS 9. mapping service and QoS parameter 10. establishing policy authorization session 2

11. updating PCC Rule 1 (including the priority of the rule, service flow 1 and Qos rule 1) according to service flow 12. updating and sending policy rule PCC Rule 1

13. executing PCC Rule 1 and selecting UPF to introduce service routing and guarantee Service QoS

FIG. 7

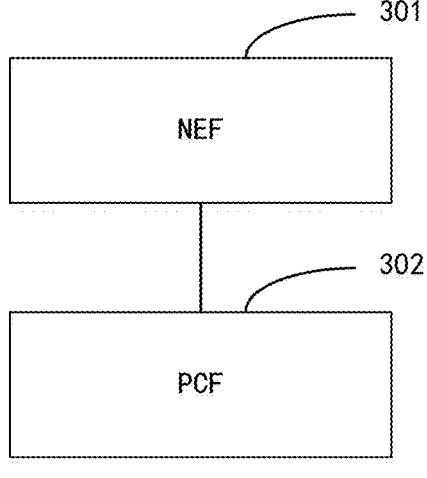

301

NEF

302

PCF

FIG. 8

APPLICATION REQUEST PROCESSING METHOD, SYSTEM, ELECTRONIC DEVICE AND STORAGE MEDIUM

CROSS-REFERENCE TO RELATED APPLICATIONS

This application is the National Stage of International Application No. PCT/CN2021/094397, filed on May 18, 2021, which claims priority to Chinese Patent Application No. 202010589409.7, filed on Jun. 24, 2020, the entire contents of which are incorporated herein by reference.

TECHNICAL FIELD

The present application relates to the technical field of communications, and in particular to an application request processing method, a system, an electronic device and a storage medium.

BACKGROUND

The third generation partnership project (3GPP) introduces the 5G network as the fifth generation mobile communication network. Currently, 3GPP proposes a network architecture according to service-based interfaces as shown in FIG. 1, a policy control function (PCF) is responsible for policy control such as a QoS, a billing, an access mobility, a user equipment (UE), etc. A network exposure function (NEF) opens the 5G core network policy control capability for the third-party application to authenticate and translate AF requests of the third-party. The AF provides the service information of the application layer to the PCF and requests the PCF for policy authorization. The session management function (SMF) provides the packet data unit (PDU) session information to the PCF, obtains the PDU session policy from the PCF and sends it to the user plane function (UPF) for execution.

However, when the AF initiates multiple application requests for the user on the service successively, the NEF will establish multiple AF authorization sessions with the PCF respectively, and the PCF sends multiple service rules to the same service decision, but after receiving multiple service rules, the SMF will select the service rule with higher priority for execution, resulting in that the service rule with lower priority is not executed and the corresponding application request is not responded.

SUMMARY

Embodiments of the present application provide an application request processing method, including: forming an overall service rule in response that two or more different application requests exist for a user on a service, wherein the overall service rule comprises a service rule of each application request.

Embodiments of the present application provide an application request processing system, including: a network exposure function (NEF); and a policy control function (PCF); wherein the NEF is for receiving an application request initiated by an application function (AF), and requesting an authorization of a service rule from the PCF according to the application request; and wherein the PCF is for forming an overall service rule in response that two or more different application requests exist for the user on the service, and the overall service rule comprises a service rule of each application request.

Embodiments of the present application provide an electronic device, including: at least one processor; and a memory communicated with the at least one processor; wherein the memory stores instructions executable by the at least one processor, when the instructions are executed by the at least one processor, the at least one processor performs an application request processing method as mentioned above.

Embodiments of the present application provide a computer readable storage medium, wherein the computer readable storage medium stores a computer program, the computer program when executed by a processor implements the application request processing method as mentioned above.

BRIEF DESCRIPTION OF THE DRAWINGS

One or more embodiments are illustrated exemplarily by the drawings, and these exemplary illustrations do not constitute a limitation of the embodiments.

FIG. 7 is a flowchart of a decision for the PCF of the application request processing method for the AF to initiate an application request for data streaming first and then initiate an application request for QoS assurance according to the second embodiment of the present application.

FIG. 8 is a schematic structural diagram of the module of the application request processing system according to a third embodiment of the present application.

DETAILED DESCRIPTION OF THE EMBODIMENTS

In order to make the purpose, technical solutions and advantages of the embodiments of the present application clearer, each of the embodiments of the present application will be described in detail below in conjunction with the drawings. However, it will be understood by those skilled in the art that in each embodiment of the present application, many technical details are presented to enable the reader to better understand the present application. However, even without these technical details and various variations and modifications based on each of the following embodiments, the technical solutions protected by the present application can be realized. The following embodiments are divided for descriptive convenience and shall not constitute any limitation to the specific manner of the present application, and the individual embodiments may be combined and referenced to each other without contradiction.

A first embodiment of the present application relates to an application request processing method. Whether two or more different application requests exist for the user on the service is determined, and an overall service rule is formed if two or more different application requests exist for the user on the service, the overall service rule contains a service rule for each application request. The overall service rule is formed according to different application requests, which can make the service rules of different application requests exist in the overall service rule, so that the service rule of each application request can be executed and the corresponding application requests can be responded.

Figures 1, 2:
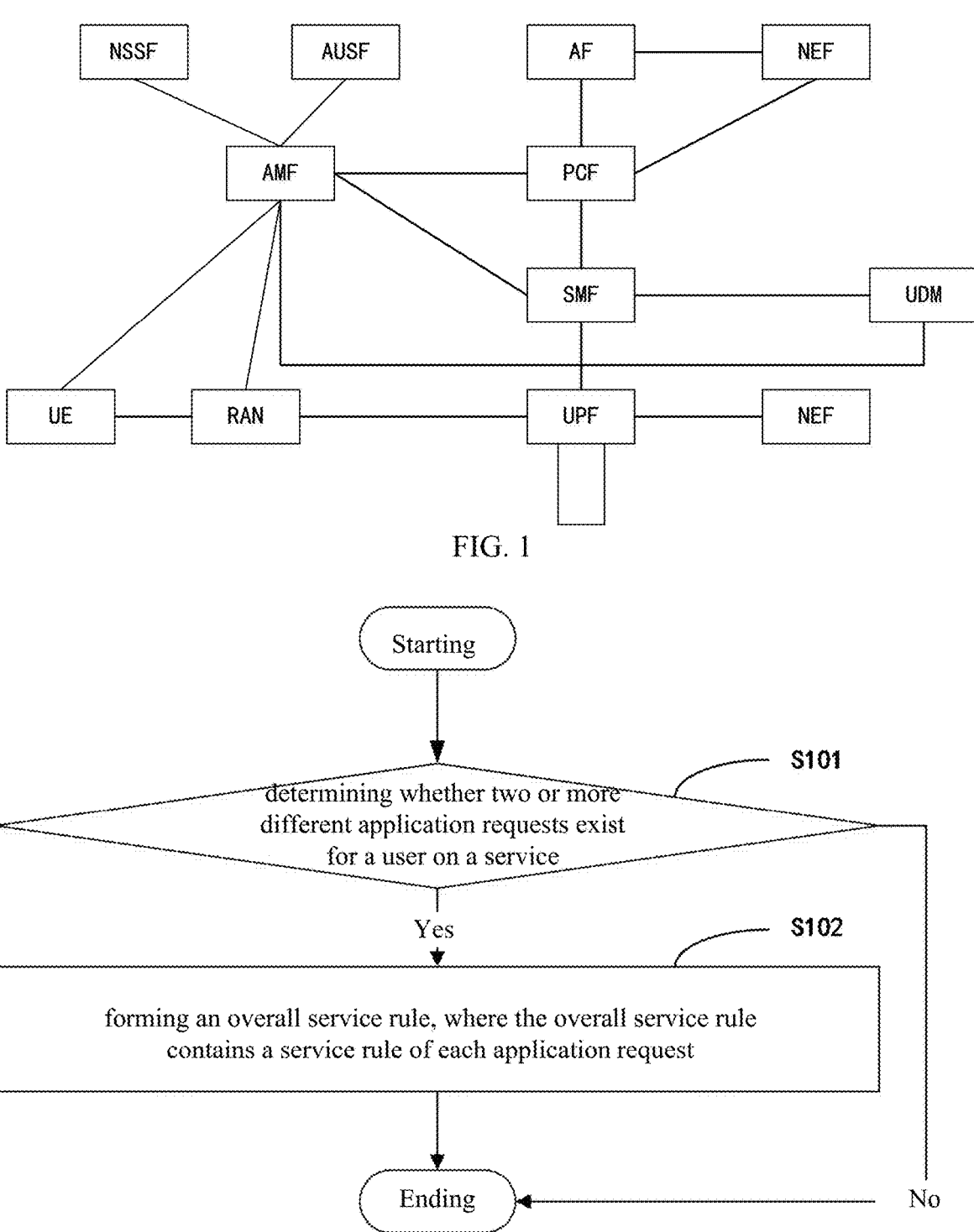
FIG. 1 is a diagram of an application scenario of an application request processing method according to a first embodiment of the present application.
FIG. 2 is a flowchart of the application request processing method according to the first embodiment of the present application.

It should be noted that the application scenario shown in FIG. 1 is an optional application scenario of the application request processing method according to the embodiment of the present application, and the application request processing method according to the embodiment of the present application may also be applied in other similar application scenarios. In addition, the PCF shown in FIG. 1 can be an optional execution subject of the application request processing method according to the embodiment of the present application. In FIG. 1, a RAN refers to a radio access network, a NSSF refers to a network slice selection function, an AUSF refers to an authentication server function, an AMF refers to an access and mobility management function, and an UDM refers to a unified data management function.

The specific process of the application request processing method according to the embodiment of the present application is shown in FIG. 2, and includes the following operations:

S101: determining whether two or more different application requests exist for a user on a service, and if two or more different application requests exist for the user on the service, executing S102, otherwise ending the process.

It can be understood that the determination of whether two or more different application requests exist for the user on the service includes the determination of three conditions: 1. a determination of whether the user is the same; 2. a determination of whether the service is the same; 3. a determination of whether the application requests are the same. The determination criteria of the three conditions can be set according to the actual situation, and no specific limitation is made here. For example, whether the user is the same can be determined according to whether the IP address of the user is the same. Whether the service is the same can be determined according to whether the service flow is the same. Whether the application request is the same can be determined according to whether the request parameters corresponding to the application request are the same. In addition, the determination of the three conditions can be separate or combined together, for example, whether the service is the same and whether the application request is the same are determined together.

It should be noted that the "the process ends when the determination result of whether two or more different application requests for the user on the service is no" is only one of the embodiments of the present application. In practical application, when the above determination result is no, it may indicate different users, different services, the same application requests, etc. The corresponding follow-up process can be set according to the actual situation. In addition, the existence of two or more different application requests for the user on the service means that different application requests for the user on the service exist at the same time, for example, two or more different application requests exist at a certain moment, and there can be an order of successive occurrence between different application requests.

S102: forming an overall service rule, where the overall service rule contains a service rule of each application request.

In forming the overall service rule, the service rule of the application request that has occurred can be updated according to the service rule of the new application request, or the service rule can be created according to the service rules of two or more application requests, and the specific way of forming the overall service rule can be set according to the actual needs, which is not limited herein. It can be understood that the overall service rules can be formed by the way that the PCF shown in FIG. 1 decides the overall service rules.

In an embodiment, after forming an overall service rule, it also includes: sending the overall service rule to the SMF for the SMF to execute the overall service rule. By sending the overall service rules to the SMF, the overall service rules are executed and individual application requests are responded accordingly.

In order for the SMF to execute the overall service rule after the overall service rule is sent to the SMF, in an embodiment, the previously sent service rule can be replaced with the overall service rule, or the priority of the overall service rule can be set to the highest, and the SMF executes the service rule with the highest priority, so that the overall service rule is executed by the SMF.

It can be understood that the overall service rule is sent to the SMF, so that the overall service rule is executed, and if the executing subject of the service rule changes, that is not the SMF, then the overall service rule can be sent to the changed executing subject of the service rule.

In an embodiment, the application request method provided by the embodiment of the present application is applied to the PCF. Similarly, the application request method is applied to the PCF, because the PCF serves as the subject of the authorized service rule in the current architecture of the 5G network, and if the subject of the authorized service rule changes in the updated architecture, that is not in the PCF, the application request method can be applied to the changed subject of the authorized service rule.

In an embodiment, the application request may include a quality of service (QOS) assurances, a data splitting, an IPTV, and a background data flow. In other embodiment, it may also be other application requests, which are not specifically limited by the embodiments of the present application.

The application request processing method provided by the embodiment of the present application determines whether two or more different application requests exist for the user on the service, and an overall service rule containing the service rules of each application request is formed if two or more different application requests exist for the user on the service. Since the service rules of different application requests for the user on the service will all exist in the overall service rule, when the overall service rule is executed, the service rules of each application request can be executed, so that each application request can be responded.

A second embodiment of the present application relates to an application request processing method, and a second embodiment is substantially the same as a first embodiment, with the main difference that: in the present application embodiment, the operation of forming an overall service rule if two or more different application requests exist for the user on the service includes: if the current application request for the user on the service is different from the existing application request, adding the service rules of the current application request to the service rules of the existing application request. The service rules of the current request are added to the service rules of the existing application request, the overall service rules are formed, and the service rules of the current application request are executed while the service rules of the existing application request are executed, and then the current application request is responded, so that each application request is responded.

Figure 3:
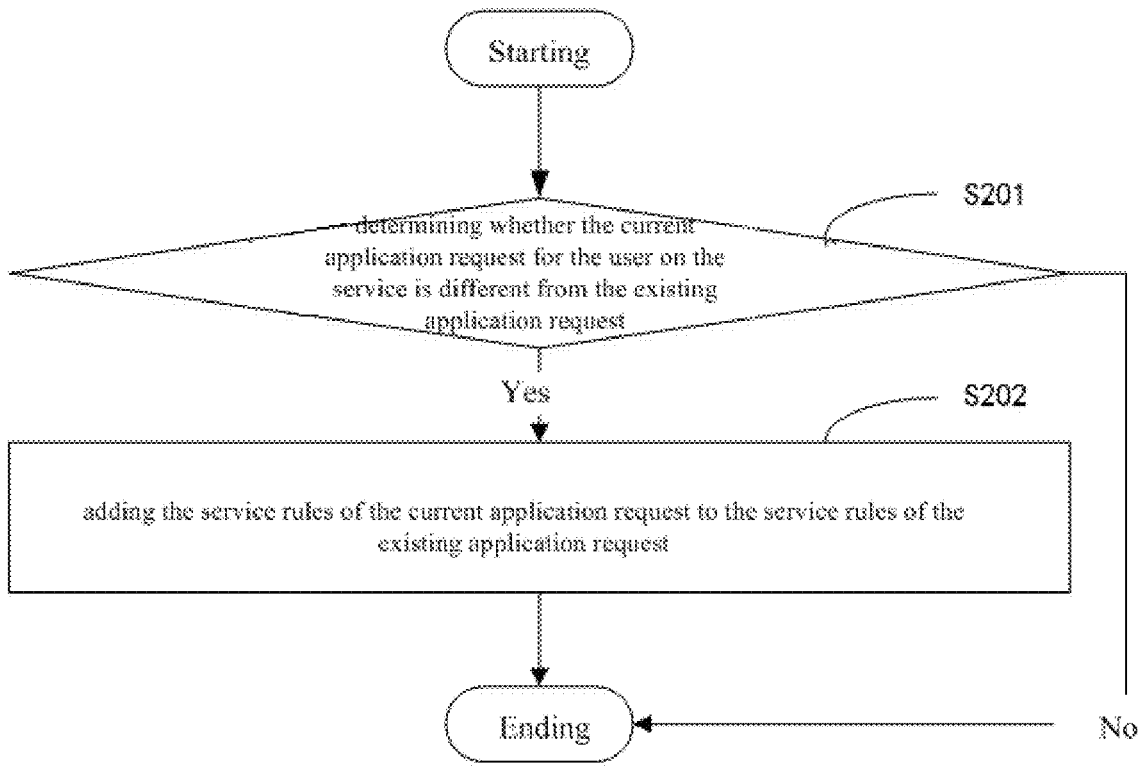
FIG. 3 is a flowchart of the application request processing method according to a second embodiment of the present application.

The specific process of the application request processing method according to the embodiment of the present application is shown in FIG. 3, and includes the following operations:

S201: determining whether the current application request for the user on the service is different from the existing application request, and if the current application request for the user on the service is different from the existing application request, S202 is executing the S202, otherwise the process ends.

The existing application request has already occurred and the service rule is being executed. The current application request is received now and not yet authorized by the service rule decided the executing subject (e.g., PCF).

It should also be noted that the embodiment of the present application "process ends when the determination result of whether the current application request for the user on the service is different from the existing application request is no" is only one of the embodiments, and in practice, when the above determination result is no, it may indicate different users, different service, the application requests, etc., and the corresponding subsequent process can be set according to the actual situation.

In an embodiment, the operation of determining whether the current application request for the user on the service is different from the existing application request can be: determining whether the current application request for the user and the existing application request have the same service flow and same request parameters.

In an embodiment, if the current application request for the user and the existing application request have the same service flow and different request parameters, the current application request and the existing application request for the user on the service are determined to be different. In an embodiment, before determining whether the current application request for the user and the existing application request have the same service flow and the same request parameters, it can first determine whether the authorization session corresponding to the current application request and the authorization session of the existing application request are duplicate sessions, and if they are duplicate sessions, the current application request is ignored; if they are not duplicate sessions, then it is further to determine whether the current application request for the user and the existing application request have the same service flow and same request parameters.

S202: adding the service rules of the current application request to the service rules of the existing application request.

In an embodiment, adding the service rules of the current application request to the service rules of the existing application request can be: updating the service rules of the current application request to the authorized service rules of the existing application request, to complete the update of the service rules for forming the overall service rules, or can be combining the service rules of the current application request with the service rules of the existing application request to obtain a new service rule, and the overall service rule is obtained according to the new service rule.

In order to more clearly illustrate the application request processing method according to the embodiment of the present application, the following takes two common application request for QoS assurance and data streaming as an example for illustration.

Figure 4:
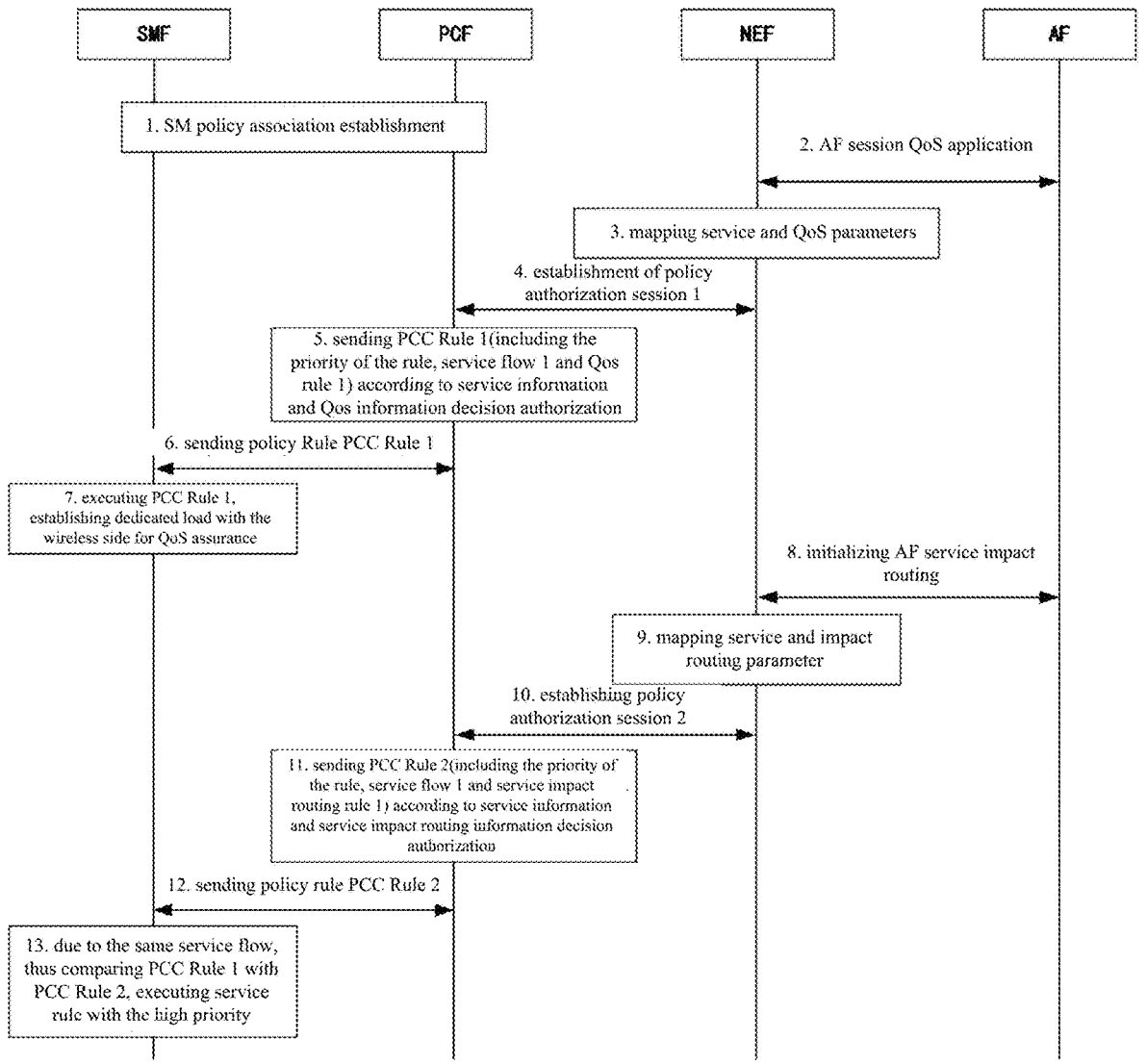
FIG. 4 is a flowchart of a decision for a PCF for the AF to initiate an application request for QoS assurance first and then initiate an application request for data streaming in the prior art.

Please refer to FIG. 4, which shows a flowchart of a decision of the PCF in the prior art for the AF to initiate an application request for QoS assurance first and then initiate an application request for data streaming, and the flowchart is as follows.

1. The SMF initiates a PDU session establishment request, and the PCF accepts the PDU session establishment request to establish a PDU session.
2. The AF initiates an application request for QoS assurance to NEF, where the application request for QoS assurance includes parameters such as a service flow, an IP address of UE, and an upstream and downstream bandwidth.
3. The NEF maps the service and QoS parameters according to the configuration.
4. The NEF invokes Npcf_PolicyAuthorization_Create to establish the policy authorization session 1, wherein the policy authorization session 1 includes media components, service flows and QoS requests.
5. The PCF binds the policy authorization session 1 to the established PDU session and makes a decision for the authorization service rule (policy control and charging) PCC Rule1 according to the service information and QoS information, where PCC Rule1 contains a priority of the rules, a service flow 1 and a QoS rule 1.
6. The PCF sends the policy rule PCC Rule1 to the SMF.
7. The SMF executes PCC Rule1 and establishes dedicated load with the wireless side for QoS assurance.
8. The AF streams the user services according to the requirements (i.e., to initiate the application request for data streaming), where the application request for data streaming initializes the service impact routing (including parameters such as a service flow, a service impact routing).
9. The NEF completes the mapping according to the configuration of service and impact routing parameters.
10. The NEF invokes Npcf_PolicyAuthorization_Create to establish policy authorization session 2, where the policy authorization session 2 includes media components, service flows, DNAI and service routing information.
11. The PCF binds the policy authorization session 2 to the established PDU session and makes a decision for the authorization service rule PCC Rule2 according to the service information and the service impact routing information, wherein PCC Rule2 contains a priority of the rules, service flow 1 and service impact routing rule 1.
12. The PCF sends the policy rule PCC Rule2 to the SMF.
13. The SMF, after receiving PCC Rule2, compares PCC Rule1 with PCC Rule2, and since the service flows of the two rules are the same, the SMF selects the service rule with higher priority to execute, and doesn't execute the unselected service rule. For example, if the priority of PCC Rule1 is higher than PCC Rule2, the SMF only executes PCC Rule1 and doesn't execute PCC Rule2, and the application request for data streaming will not be responded; if the priority of PCC Rule is lower than PCC Rule2, the SMF only executes PCC Rule2, and the application request for QoS assurance will not be responded.

Since the SMF will select the service rule with higher priority to execute, the service rule with lower priority cannot be executed, so that the corresponding application request will not be responded.

Figure 5:
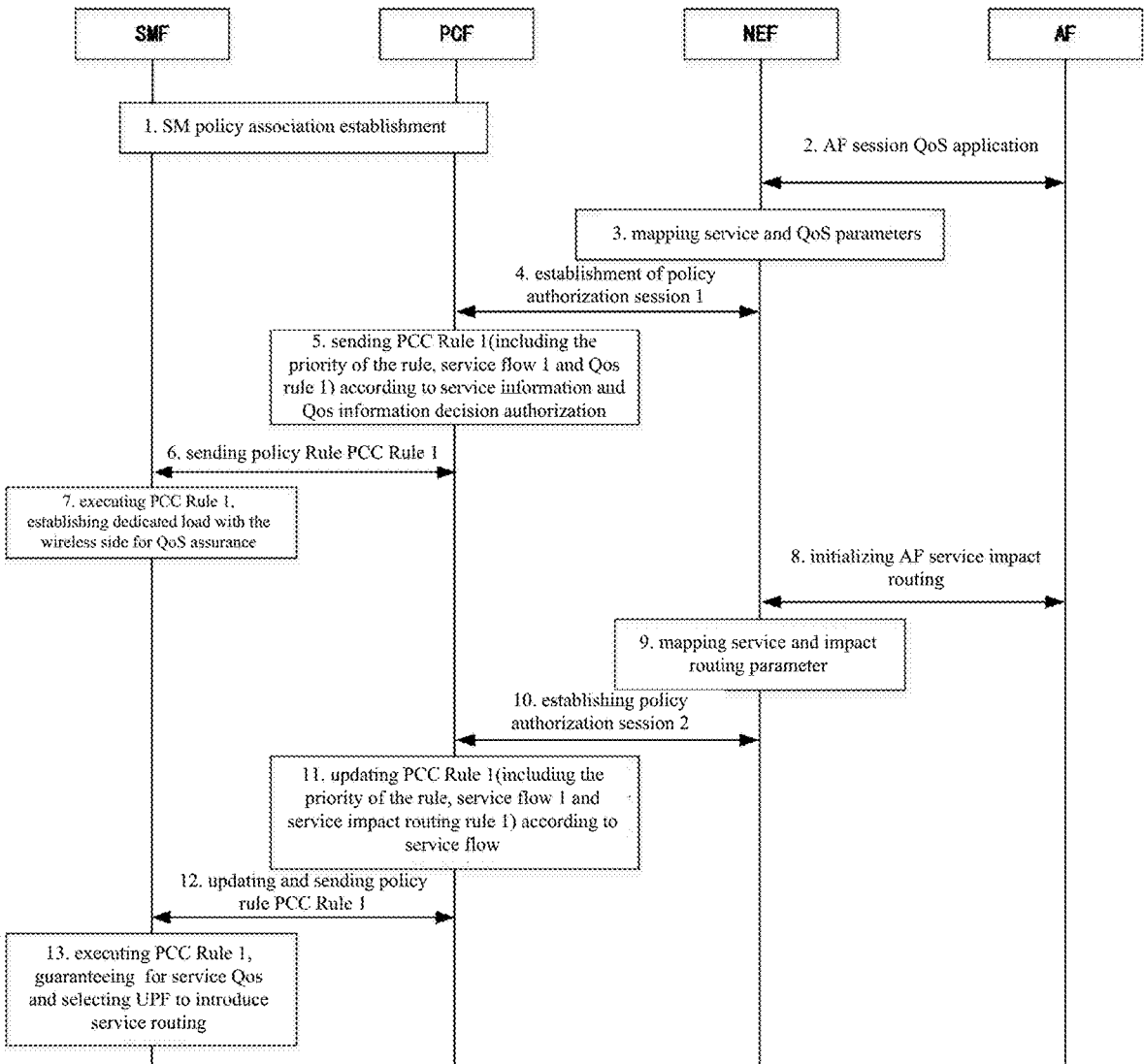
FIG. 5 is a flowchart of a decision for the PCF of the application request processing method for the AF to initiate an application request for QoS assurance first and then initiate an application request for data streaming according to the second embodiment of the present application.

Please refer to FIG. 5, which shows a flowchart of a decision for the PCF of the application request processing method for the AF to initiate an application request for QoS assurance first and then initiate an application request for data streaming according to the embodiment of the present application, and the flowchart is as follows:

1. The SMF initiates a PDU session establishment request, and the PCF accepts the PUD session establishment request to establish a PDU session.
2. The AF initiates the application request for QoS assurance to the NEF, where the QoS assurance application request includes parameters such as a service flow, an IP address of UE, and upstream and downstream bandwidth.
3. The NEF maps the service and QoS parameters according to the configuration.
4. The NEF invokes Npcf_PolicyAuthorization_Create to establish policy authorization session 1, wherein the policy authorization session 1 includes media components, service flows and QoS requests.
5. The PCF binds the policy authorization session 1 to the established PDU session and makes a decision of the authorization service rule PCC Rule1 according to the service information and QoS information, where PCC Rule1 contains the priority of the rule, a service flow 1 and a QoS rule 1.
6. The PCF sends the policy rule PCC Rule1 to the SMF.
7. The SMF executes PCC Rule1 to establish dedicated load with the wireless side to assurance service QoS.
8. The AF streams the user services according to the requirements (i.e., to initiate the application request for data streaming), where the application request for data streaming initializes the service impact routing (including parameters such as a service flow, a service impact routing).
9. The NEF completes mapping according to the configuration of service and impact routing parameters.
10. The NEF invokes Npcf_PolicyAuthorization_Create to establish policy authorization session 2, where the policy authorization session 2 includes media components, service flows, DNAI and service routing information.
11. The PCF, after receiving am establishment request of the policy authorization session 2, makes a decision for service authorization decision, which may include:
   (1) binding the policy authorization session 2 to the established PDU session;
   (2) if it is determined that the establishment request of policy authorization session 2 has the same service flow (consistent) as the authorization session request previously bound to the PDU session and the other (except for the service flow) authorization request parameters are different (not a duplicate session), the decision to update the service rules is considered; and
   (3) updating PCC Rule1 according to the authorization session information to add service data streaming rules, so that the updated PCC Rule1 contains the priority of the rules, service flow 1, QoS rule 1 and service impact routing rule 1.
12. The PCF sends the updated policy rule PCC Rule1 to the SMF.
13. The SMF, after receiving PCC Rule1, executes the rule to select UPF to stream data to the data network (to achieve data streaming) and maintain the QoS assurance policy for the previous service data.

The existing service rules for QoS assurance are updated according to the service rules of the application request for data streaming, so that the updated service rules include both the service rules for QoS assurance and the service rules for data streaming, thus realizing data streaming while realizing QoS assurance, so that the two different application requests for QoS assurance and data streaming can both be responded.

Figure 6:
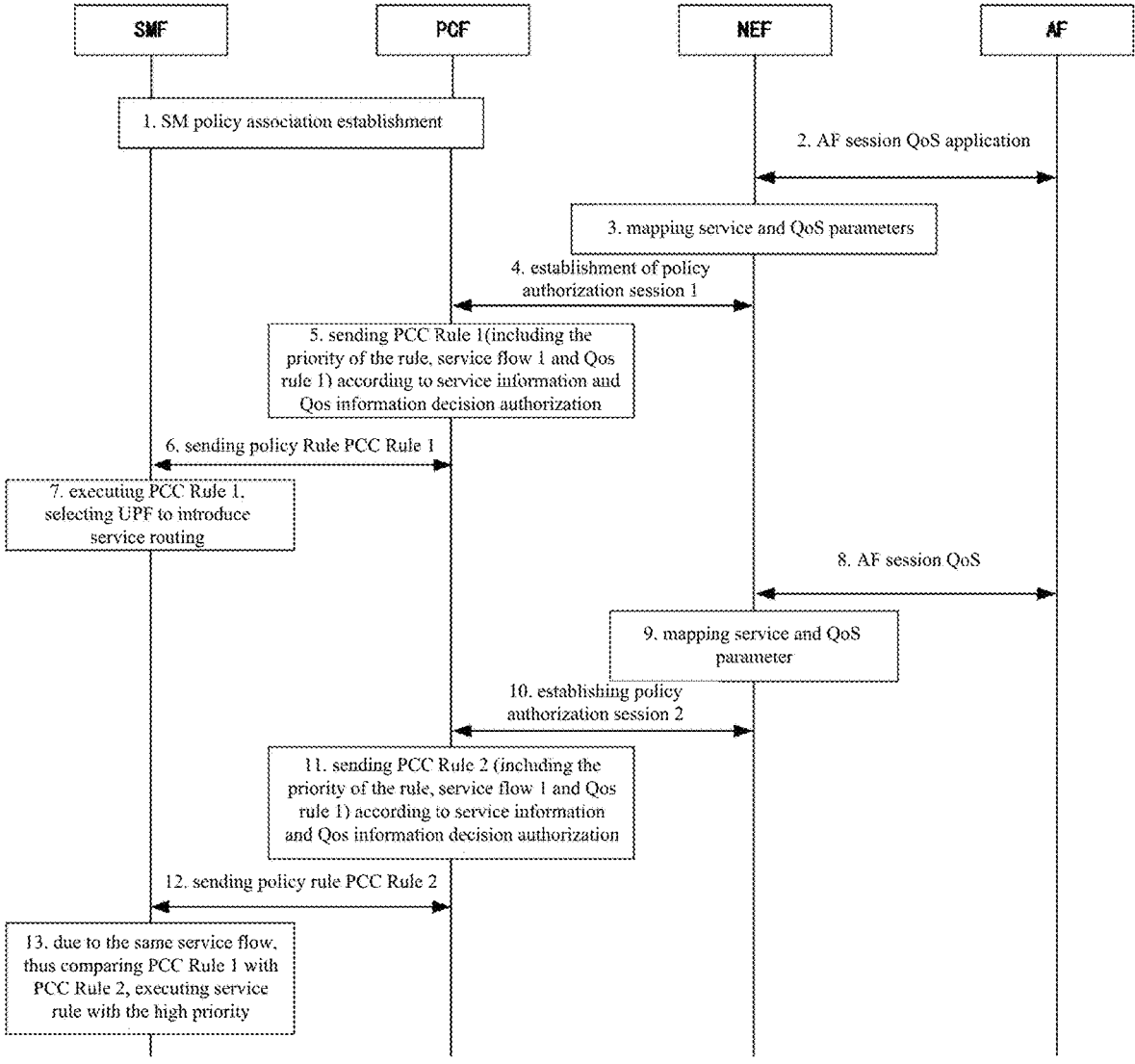
FIG. 6 is a flowchart of a decision for the PCF for the AF to initiate an application request for data streaming first and then initiate an application request for QoS assurance in the prior art.

Please refer to FIG. 6, which shows a flowchart of a decision for the PCF for the AF to initiate an application request for data streaming first and then initiate an application request for QoS assurance in some cases, and the flowchart is as follows:

1. The SMF initiates a PDU session establishment request, the PCF accepts the PDU session establishment request and establishes a PDU session.
2. The AF streams user services according to the requirements (i.e., initiate application request for data streaming), where the application request for data streaming is to initialize the service impact route (including parameters such as a service flow and a service impact route).
3. The NEF completes mapping according to the configuration of service and impact routes.
4. The NEF invokes Npcf_PolicyAuthorization_Create to establish policy authorization session 1, where the policy authorization session 1 includes media components, service flows, DNAI and service routing information.
5. The PCF binds the policy authorization session 1 to the established PDU session, and makes a decision of the authorization service rule PCC Rule1 according to the service information and the service impact routing information, where PCC Rule1 includes a priority of the rule, a service flow 1 and a service impact routing rule 1.
6. The PCF sends the policy rule PCC Rule1 to the SMF.
7. The SMF executes PCC Rule1 and selects UPF to stream the service data to the data network (to achieve data streaming).
8. The AF initiates an application request for the QoS assurance to the NEF, where the application request for the QoS assurance includes parameters such as service flow, IP address of the UE, and upstream and downstream bandwidth.
9. The NEF maps according to the configuration of the service and QoS parameters.
10. The NEF invokes Npcf_PolicyAuthorization_Create to establish policy authorization session 2, wherein the policy authorization session 2 includes media components, service flows and QoS requests.
11. The PCF binds the policy authorization session 2 to the established PDU session, and makes a decision of the authorization service rule PCC Rule2 according to the service information and QoS information, where PCC Rule2 contains the priority of the rule, service flow 1 and QoS rule 1.
12. The PCF sends the policy rule PCC Rule2 to the SMF.

13. The SMF, after receiving PCC Rule2, compares PCC Rule1 with PCC Rule2. Since the service flows of both rules are the same, the SMF selects the service rule with higher priority to execute, and doesn't execute the unselected service rule. For example, if the priority of PCC Rule1 rule is higher than PCC Rule2, the SMF only executes PCC Rule1 and doesn't execute PCC Rule2, and the application request for QoS assurance will not be responded; if the priority of PCC Rule1 rule is lower than PCC Rule2, the SMF only executes PCC Rule2, and the application request for data streaming will not be responded.

Since the SMF will select the service rule with higher priority to execute, the service rule with lower priority cannot be executed, so that the corresponding application request will not be responded.

Please refer to FIG. 7, which shows a flowchart of a decision for the PCF of the application request processing method for the AF to initiate an application request for data streaming first and then initiate an application request for QoS assurance according to the embodiment of the present application, and the flowchart is as follows.

1. The SMF initiates a PDU session establishment request, the PCF accepts the PDU session establishment request and establishes a PDU session.
2. The AF streams user services according to the requirements (i.e., initiate application request for data streaming), where the application request for data streaming is to initialize service impact routing (including parameters such as service flow and service impact routing).
3. The NEF completes mapping according to the configuration of service and impact routing parameters.
4. The NEF invokes Npcf_PolicyAuthorization_Create to establish policy authorization session 1, where the policy authorization session 1 includes media components, service flows, DNAI and service routing information.
5. The PCF binds the policy authorization session 1 to the established PDU session, and makes a decision for the authorization service rule PCC Rule1 according to the service information and the service impact routing information, where PCC Rule1 includes a priority of the rule, a service flow 1 and a service impact routing rule 1.
6. The PCF sends the policy rule PCC Rule1 to the SMF.
7. The SMF executes PCC Rule1 and selects UPF to stream service data to the data network (to achieve data streaming).
8. The AF initiates an application request for QoS assurance to the NEF, where the application request for QoS assurance includes parameters such as a service flow, an IP address of the UE, and upstream and downstream bandwidth.
9. The NEF maps according to the configuration of the service and QoS parameters.
10. The NEF invokes Npcf_PolicyAuthorization_Create to establish policy authorization session 2, wherein the policy authorization session 2 includes media components, service flows and QoS requests.
11. The PCF, after receiving an establishment request of the policy authorization session 2 and makes a decision for service authorization, which may specifically include:
(1) binding the policy authorization session 2 to an established PDU session;
(2) if it is determined that the establishment request of policy authorization session 2 has the same service flow (consistent) as the authorization session request previously bound to the PDU session and the other (except for the service flow) authorization request parameters are different (not a duplicate session), the decision to update the service rules is considered; and
(3) updating PCC Rule1 according to the authorization session information to add service QoS assurance rules, so that the updated PCC Rule1 contains a priority of the rule, a service flow 1, a service impact routing rule 1 and QoS rule 1;
12. The PCF sends the updated policy rule PCC Rule1 to the SMF.
13. The SMF, after receiving PCC Rule1, executes the rule to establish dedicated load assurance service QoS (to achieve QoS assurance) and maintain streaming service data to the previous data network (data streaming).

The existing service rules for data streaming are updated according to the service rules of application requests for the QoS assurance, so that the updated service rules include both the service rules for data streaming and the service rules for QoS assurance, thereby realizing QoS assurance while realizing data streaming, so that both different application requests, data streaming and QoS assurance, can be responded.

The application request processing method according to the embodiment of the present application forms an overall service rule by adding the service rule of the current request to the service rule of the existing application request, so that the service rule of the current application request can be executed while the service rule of the existing application request is executed, and then the current application request is responded, so that each application request can be responded to.

In addition, those skilled in the art can understand that the above division of the operations of the various methods is only for the purpose of describing clearly, and the embodiment can be combined into one operation or some operations can be split and decomposed into multiple operations, as long as they include the logical relationship, they are within the scope of the present application; adding insignificant modifications to the algorithm or process or the design to introducing insignificant design, but not changing the core design of the algorithm and the process is within the scope of the present application. The core design of the process is within the scope of the present application.

A third embodiment of the present application relates to an application request processing system, as shown in FIG. 8, including: a NEF 301 and a PCF 302.

The NEF 301 is for receiving application requests initiated by AF and requesting an authorization of service rules from PCF 302 according to the application requests.

The PCF 302 is for forming an overall service rule in response that two or more different application requests exist for the user on the service, the overall service rule contains the service rules of each application request.

Figure 9:
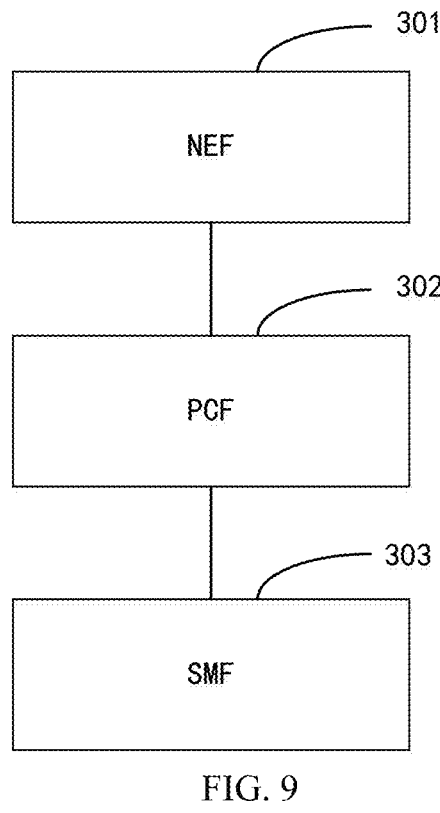
FIG. 9 is a schematic structural diagram of another module of the application request processing system according to the third embodiment of the present application.

Referring to FIG. 9, which shows a schematic structural diagram of another module of the application request processing system according to an embodiment of the present application, i.e., the application request processing system further includes a SMF 303.

The PCF 302 is also for sending the overall service rules to the SMF 303.

The SMF 303 is for executing the overall service rules.

The PCF 302 is further for adding the service rules of the current application request to the service rules of the existing application request when the current application request for the user on the service is different from the existing application request.

The PCF 302 is also used for determining that the current application request and the existing application request for the user on the service when the current application request for the user and the existing application request have the same service flow and different request parameters.

The application request includes a QoS assurance, a data streaming, an IPTV, and a background data streams.

The embodiment is a system embodiment corresponding to a first embodiment and a second embodiment, and the embodiment can be implemented with a first embodiment and a second embodiment in conjunction with each other. The relevant technical details mentioned in a first embodiment and a second embodiment are still valid in the embodiment, which are not repeated herein for simplify. Accordingly, the relevant technical details mentioned in the present embodiment can also be applied in a first embodiment and a second embodiment.

Each module in the embodiment is a logical module, and in practical application, a logical unit can be a physical unit, or a part of a physical unit, or can be realized as a combination of multiple physical units. In addition, in order to highlight the innovative part of the present application, the embodiment does not introduce units that are less closely related to solving the technical problem presented by the present application, but this does not indicate that other units do not exist in the present embodiment.

Figure 10:
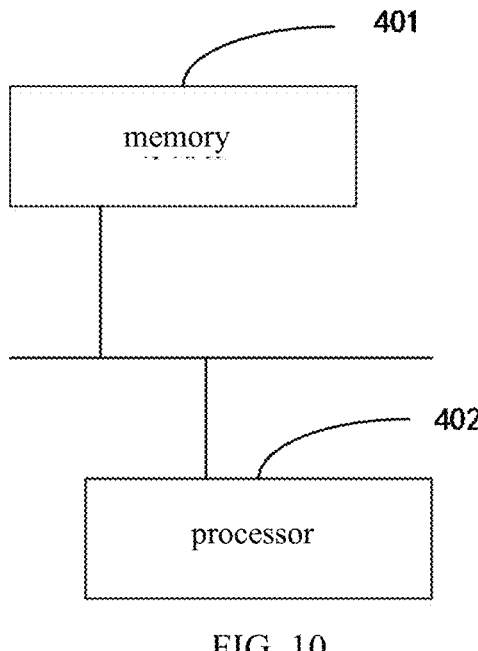
FIG. 10 is a schematic structural diagram of an electronic device according to a fourth embodiment of the present application.

A fourth embodiment of the present application relates to an electronic device, as shown in FIG. 10, the electronic device including: at least one processor 401; and a memory 402 communicated with the at least one processor 401; the memory 402 stores instructions executable by the at least one processor 401, the instructions are executed by the at least one processor 401 to enable the at least one processor 401 to perform the application request processing method as mentioned above.

The memory and the processor are connected by using a bus, and the bus may include any number of interconnected buses and bridges, and the bus connects various circuits of one or more processors and the memory together. The bus may also connect together various other circuits such as peripherals, voltage regulators, and power management circuits, which are well known in the art and therefore will not be further described herein. The bus interface provides an interface between the bus and the transceiver. The transceiver may be a single element or a plurality of elements, such as a plurality of receivers and transmitters, providing units for communicating with various other devices on a transmission medium. Data processed by the processor is transmitted over the wireless medium via an antenna, and further, the antenna also receives the data and transmits it to the processor.

The processor is responsible for managing the bus and the usual processing, and may also provide various functions including timing, peripheral interfaces, a voltage regulation, a power management, and other control functions, and the memory may be used to store data used by the processor in performing operations.

A fifth embodiment of the present application relates to a computer readable storage medium storing a computer program. The computer program implements the method described above when executed by the processor. The computer-readable storage medium includes a transient or non-transient, removable or non-removable medium implemented in any method or technology for storing information, such as computer-readable instructions, data structures, computer program modules, or other data.

That is, it is understood by those skilled in the art that all or some of the steps in implementing the method of the above embodiments may be accomplished by instructing the relevant hardware by means of a program stored in a storage medium including a number of instructions to cause a device (which may be a microcontroller, a chip, etc.) or processor to perform all or some of the steps of the method described in the various embodiments of the present application. The storage media includes: a USB flash drive, a mobile hard disk, a read-only memory (ROM), a random access memory (RAM), a disk or a CD-ROM, and other media that can store program code.

It should be understood by those skilled in the art that all or some of the steps, systems, functional modules/units in the methods disclosed above may be implemented as software (which may be implemented with computer program code executable by a computing device), a firmware, a hardware, and suitable combinations thereof. In hardware implementations, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processor, a digital signal processor, or a microprocessor, or as hardware, or as an integrated circuit, such as a specialized integrated circuit.

It will be understood by those skilled in the art that the above embodiments are specific embodiments of the present application, and that various changes in form and detail may be made to them in practical application without departing from the spirit and scope of the present application.

What is claimed is:

1. An application request processing method, comprising:
    forming an overall service rule in response that two or more different application requests exist for a user on a service, wherein the overall service rule comprises a service rule of each application request;
    wherein the forming the overall service rule in response that two or more different application requests exist for the user on the service comprises:
        adding a service rule of the current application request to a service rule of an existing application request in response that a current application request for the user on the service is different from the existing application request; and
    wherein before adding the service rule of the current application request to the service rule of the existing application request in response that the current application request for the user on the service is different from the existing application request, the application request processing method further comprises:
        in response that the current application request for the user and the existing application request have same service flow and different request parameters, determining that the current application request for the user on the service is different from the existing application request.

2. The application request processing method according to claim 1, wherein after forming the overall service rule in response that the two or more different application requests exist for the user on the service, the application request processing method further comprises:

sending the overall service rule to a session management function (SMF) for the SMF to execute the overall service rule.

3. The application request processing method according to claim 1, wherein the method is applied to a policy control function (PCF).

4. The application request processing method according to claim 1, wherein the application request comprises a quality of service (QoS) assurance, a data splitting, an IPTV and a background data flow.

5. An electronic device, comprising:

at least one processor; and a memory communicated with the at least one processor;

wherein the memory stores instructions executable by the at least one processor, when the instructions are executed by the at least one processor, the at least one processor performs an application request processing method according to claim 1.

6. A non-transitory computer readable storage medium, wherein the non-transitory computer readable storage medium stores a computer program, the computer program when executed by a processor implements the application request processing method according to claim 1.

7. An application request processing system, comprising:

a network exposure function (NEF); and a policy control function (PCF);

wherein the NEF is for receiving an application request initiated by an application function (AF), and requesting an authorization of a service rule from the PCF according to the application request; and wherein the PCF is for forming an overall service rule in response that two or more different application requests exist for the user on the service, and the overall service rule comprises a service rule of each application request;

wherein the PCF is further for adding a service rule of the current application request to a service rule of an existing application request in response that a current application request for the user on the service is different from the existing application request; and wherein before adding the service rule of the current application request to the service rule of the existing application request in response that the current application request for the user on the service is different from the existing application request, the PCF is further for:

in response that the current application request for the user and the existing application request have same service flow and different request parameters, determining that the current application request for the user on the service is different from the existing application request.

8. The application request processing system according to claim 7, further comprising:

a SMF;

the PCF for sending the overall service rule to the SMF; and the SMF for executing the overall service rule.

* * * * *